United States Patent [19]
Bigelow, Jr.

[11] Patent Number: 5,685,165
[45] Date of Patent: Nov. 11, 1997

[54] PORTABLE AIR CONDITIONING SYSTEM

[76] Inventor: Floyd E. Bigelow, Jr., 18003 Spellbrook, Houston, Tex. 77084

[21] Appl. No.: 679,139

[22] Filed: Jul. 12, 1996

[51] Int. Cl.$^6$ .................................................. F25D 3/02
[52] U.S. Cl. ........................ 62/420; 62/457.2; 62/434; 62/426
[58] Field of Search ................... 62/457.2, 457.7, 62/457.9, 404, 407, 386, 420, 422, 424, 426, 460, 434, 430; 165/77

[56] References Cited

U.S. PATENT DOCUMENTS

| | | |
|---|---|---|
| 1,230,914 | 6/1917 | McMoore ............................ 62/389 |
| 1,860,357 | 5/1932 | Gant . |
| 2,022,523 | 11/1935 | Roessler . |
| 2,584,442 | 2/1952 | Frie . |
| 3,395,550 | 8/1968 | Dungan ............................ 62/464 |
| 3,405,758 | 10/1968 | Walker et al. ..................... 165/16 |
| 3,411,569 | 11/1968 | Hildreth ............................ 165/63 |
| 3,498,076 | 3/1970 | Michael ............................ 62/389 |
| 3,625,022 | 12/1971 | Johnson . |
| 3,979,007 | 9/1976 | Thornbloom, Jr. ................. 220/23 |
| 4,076,072 | 2/1978 | Bentz ................................ 165/148 |
| 4,128,170 | 12/1978 | Elliott ............................... 43/54.1 |
| 4,213,310 | 7/1980 | Buss ................................. 62/457 |
| 4,429,734 | 2/1984 | Vandervaart ...................... 165/29 |
| 4,657,178 | 4/1987 | Meckler ............................ 236/13 |
| 4,861,301 | 8/1989 | Pomeroy et al. ................. 441/131 |
| 4,889,267 | 12/1989 | Bolton .............................. 224/274 |
| 4,989,767 | 2/1991 | Buschbom ........................ 224/274 |
| 4,998,415 | 3/1991 | Larsen ............................. 62/231 |
| 5,038,515 | 8/1991 | Moorhead ........................ 43/55 |
| 5,062,280 | 11/1991 | Martin, Sr. ....................... 62/291 |

FOREIGN PATENT DOCUMENTS 337.173  11/1903  France ................................. 62/420

OTHER PUBLICATIONS

How It Works–Air Conditioning, Popular Mechanics, p. 93, Feb. 93.
Ruud Indoor Coils, Ruud Air Conditioning Division, 1989.

Primary Examiner—John M. Sollecito
Attorney, Agent, or Firm—Guy McClung

[57] ABSTRACT

A portable air conditioning system has been invented which, in one aspect has a support frame with a fan mounted behind a radiator, and a power supply for selectively providing power to run the fan. The system is mountable in or on a container such as a typical ice chest. In one embodiment, water and ice are place in the ice chest for cooling a small room or a vehicle's interior.

16 Claims, 5 Drawing Sheets

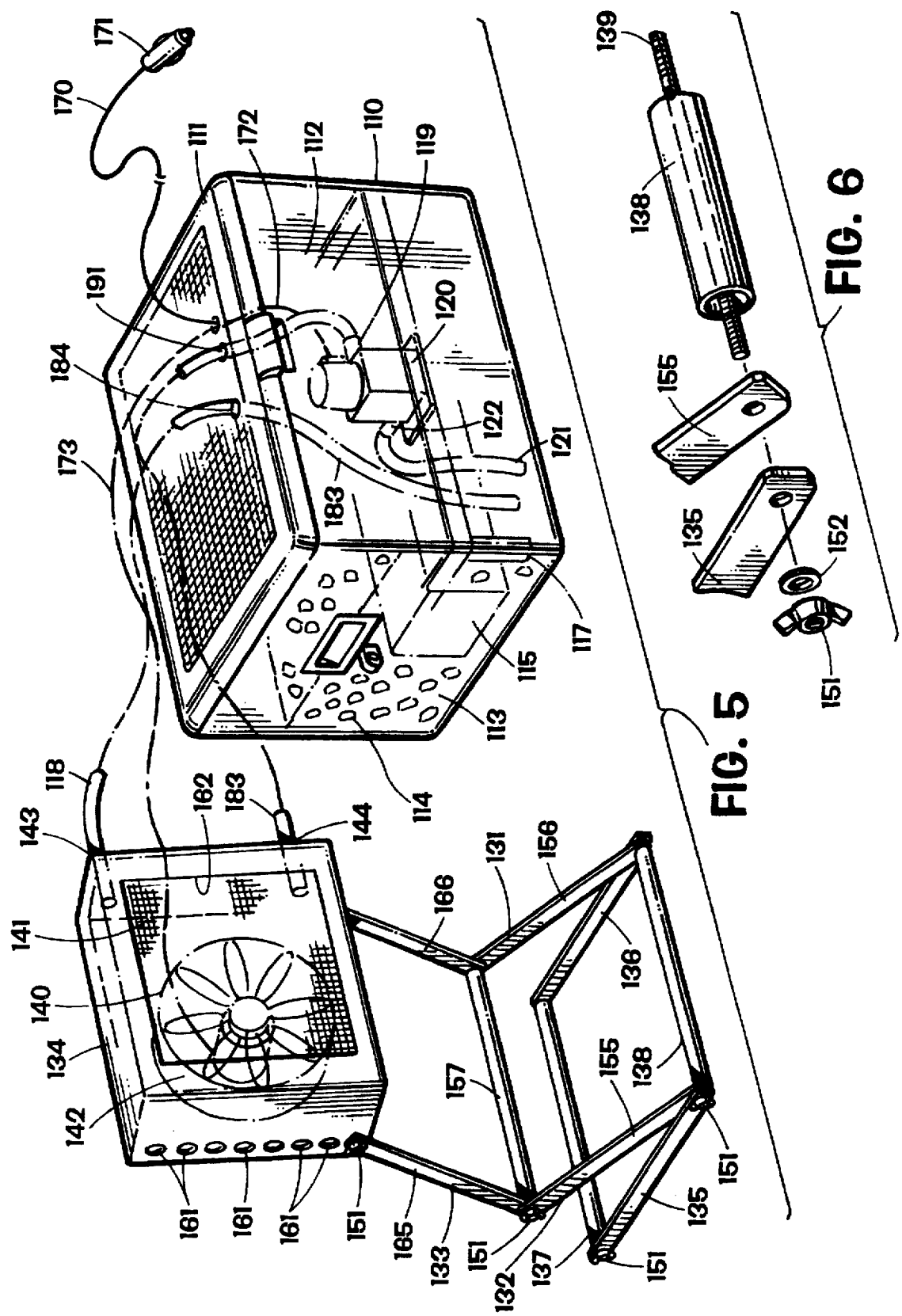

PORTABLE AIR CONDITIONING SYSTEM

BACKGROUND OF THE INVENTION

1. Field of the Invention

The present invention is directed to a portable air conditioning system for heating or cooling; in one aspect such a system which is useful in a small room or in a vehicle, e.g. a car, plane, or boat, which does not have its own air conditioning system.

2. Description of Related Art

A variety of vehicles, typically smaller cars, planes, and boats, do not have their own cooling/heating system. In hot or cold weather these vehicles can be very uncomfortable. For example, in a small airplane such as a Cessna 172 which has no integrated air conditioning system, the cabin interior can be as hot as or hotter than the environment, e.g. over 100° F. when the outside temperature is 100° F. Typically it takes about fifteen to thirty minutes from the time such a plane takes off until it reaches a cool altitude, e.g. five thousand to ten thousand feet and the pilot and passengers have to endure the extreme heat until the cabin cools off. Problems are also encountered with cars and boats that are used in extreme climates.

The addition of an add-on air conditioning system to a vehicle is a complex and expensive undertaking. With respect to certain airplanes, it is very difficult to install an add-on system because of available engine power; and certain FAA regulations severely restrict such add-ons.

Adding a typical commercially available air conditioning system with either an electrical compressor or a belt driven compressor is not feasible for many planes. Electrical compressors typically require 50 to 100 amps of power or more—which exceed the available power in many planes. A belt driven unit requires a significant amount of horse power which is not available in many planes.

There has long been a need for a portable cooling/heating system for vehicles without such a system. There has long been a need for such a system which is small enough so that it does not occupy an inordinate amount of space, yet is efficient enough to heat or cool the vehicle so its passengers are comfortable. There has long been a need for such a system that may have its own power supply and need not necessarily use the vehicle's power supply.

SUMMARY OF THE PRESENT INVENTION

The present invention, in certain embodiments, discloses a portable air conditioning system for heating and/or cooling an interior space, e.g. (but not limited to) the interior of a vehicle such as a boat, car, or plane, or the interior of a room, kiosk, trailer, toll booth, or motor home. In one aspect the system includes a height-adjustable portable support frame on which is mounted a fan/radiator assembly. In another embodiment a battery is mounted on the support frame. In one aspect the portable support frame is sized and configured so that it is easily emplaceable in a box, container, or portable ice chest. The battery may be inserted in or on the box, etc. A pump is also placed adjacent or in the container and connected to the fan/radiator assembly. A hand-crank generator may be used instead of a battery; and/or a hand-operated fan and/or hand-operated pump may be used. A hard-crank generator may be used instead of a battery; and/or a hand-operated fan and/or pump may be used. Cold fluid, cold fluid and ice; or hot fluid is placed in the container. The pump pumps the fluid to the fan/radiator assembly and the fan blows air through the radiator producing a flow of conditioned air. Any known and suitable fan and any known and suitable radiator may be used, including but not limited to radiators with one, two, or more levels or thicknesses of conduits with heat exchange fins. In one aspect a switch adjacent to the container or on the support frame controls both the pump and a fan of the fan/radiator assembly. In one aspect the battery is placed outside the container. In one aspect the battery is placed in a frame or on a support connected to the outside of the container. In another aspect the power cord for the fan and-or for the pump is interconnected with the integrated power system of a vehicle or room in which the system is to be used and either no battery is needed or a battery is used as a back-up power supply. In one aspect a thermostat that senses water temperature somewhere in the system or senses temperature in the space to be cooled or heated is interconnected with the pump and/or fan/radiator assembly. If a vehicle's, plane's, or boat's electrical system is used, one embodiment of a system according to this invention uses approximately 10 amps (or less) at 12 volts.

In one embodiment the fan/radiator assembly is mounted on a base that is connected with hinges to the support frame. A movable support arm connected to the support frame is emplaceable in a series of notches on the fan/radiator base to orient the fan/radiator assembly at a variety of angles with respect to the container so that air is blown therefrom in a desired direction. In one aspect, fluid flows by pumping and/or by gravity through the radiator back down into the container. In one aspect water is the thermal fluid and it is initially at a temperature which is relatively hot or relatively cold with respect to the environment exterior to the system. In certain embodiments the water (or water and ice) occupies up to one fifth, up to one fourth, up to one half, or up to three fourths of the total volume of the container. In certain aspects the water is initially (prior to introduction into the container) at a temperature of at least seventy degrees, at least eighty degrees, at least ninety degrees, or at least one hundred degrees Fahrenheit. Preferably a pump is initially disposed in water so that the pump inlet is covered by water, typically water at a level of about 3" in a container will suffice for various commercially available pumps.

The present invention discloses, in certain embodiments, a height-adjustable support frame for a fan/radiator assembly, for a pump, for a battery, or for any two or all three of these items. The support frame may be used exteriorly of a box, container, or insulated chest (as described above) or it may be emplaced partially or entirely in the box, etc. The height-adjustable support, in certain aspects has a two or more frame pieces interconnected so that the height of one above the other can be selectively adjusted and the two parts can be releasably secured together. One or more items (fan/radiator assembly, battery, pump, thermostat) is mounted in a cabinet which is releasably and adjustably secured to one of the frame pieces.

In one embodiment legs on the support frame are adjustable so that the support frame has a range of heights with respect to the container. In one aspect the legs are adjusted so that a lid of the container may be closed with the system inside.

In certain embodiments appropriate plugs, electrical fixtures and interconnection apparatus are used so that the fan/radiator assembly and/or pump are powered by an electrical power system already present in a vehicle, Kiosk, boat or plane; e.g. an adapter is used so that it plugs into a cigarette lighter receptacle in a car, boat, or plane. In another aspect the system can use its own power supply or an external power source.

In certain embodiments an initial supply of hot or cold material is installed in the container and once this material has reached ambient temperature due to the action of the system, an additional charge of hot or cold material is installed in the container. Prior to the installation of the additional charge of material, the original material may be removed from the container. In one particular system, a typical forty-eight quart insulated ice chest with a hinged lid for closing off the chest's interior is used as the container and an initial charge of about thirty to about forth pounds of ice is placed therein, preferably with one or more quarts of water. A combination of a block or blocks of ice with crushed ice may be used (e.g. about one to about three quarts of water, ten pound block of ice, and 30 pound crushed ice; in a 48 quart chest or a 6 pound block of ice and about 32 pounds of crushed ice in a 48 quart chest). Such systems provide cooled air for thirty to sixty minutes or more before additional ice needs to be added depending on outside temperature and inside temperature. Initially doors, windows, or other closable openings in the vehicle or room may be opened to permit the escape of very hot air therefrom. After a few minutes these openings are then closed as the system begins to provide cooled air for the entire room or vehicle. Such a system delivers the cooling equivalent of approximately ¾ of a ton of air conditioning for a period of about 30 minutes to (1) one hour, depending on the amount of ice used, the initial temperature in the plane or vehicle, temperature outside of the plane or vehicle, and the degree of cooling desired. Additional tonnage of cooling can be obtained and over a longer period of time by the use of larger components, i.e. container, pump, fan and radiator, additional ice, and more water.

Typically air temperature drops about 3° F. per 1000 feet of altitude; e.g. when it is 90° F. on the ground it is 75° F. at about 5000 feet. Including start-up and taxi time, it takes about 20 to 30 minutes to reach an altitude of 5000 feet. A system according to the present invention may be used to cool down a plane's interior for this 20 to 30 minute period. In one aspect a selector switch is used so that the pump is selectively deactivated and the fan is permitted to continue running so that air is circulated through a plane's interior, but melting of ice in the system's container is retarded and inhibited since the pump is no longer pumping water to and from the fan/radiator assembly. When ice and/or cool water is still present, additional cooling is possible during a plane's descent, landing, and taxiing to a hangar or terminal.

The present invention, in certain embodiments, discloses a portable air conditioning system with a support frame, a fan/radiator assembly on the support frame, the fan/radiator assembly having a fan and a radiator, the fan mounted adjacent the radiator, the radiator having an inlet for receiving the thermal fluid and an outlet from which the thermal fluid flows out from the radiator, a container for supporting the support frame, the fan, and the radiator, a removable supply of thermal fluid in the container for flowing through the radiator, the removable supply of thermal fluid removable from the container upon reaching a desired temperature, pump apparatus for continuously pumping the thermal fluid to the radiator, the pump apparatus having an inlet for receiving the thermal fluid and an outlet in fluid communication with the inlet of the radiator, and a power supply for selectively providing power to run the fan.

In certain embodiments a portable air conditioning system according to the present invention has a support frame, a fan/radiator assembly on the support frame with a fan and a radiator, the fan mounted adjacent the radiator for propelling air through the radiator, the radiator having an inlet for receiving thermal fluid and an outlet from which the thermal fluid flows out from the radiator, a container for containing the support frame, the fan, the thermal fluid, and the radiator, a removable supply of thermal fluid in the container for flowing through the radiator, the removable supply of thermal fluid removable from the container upon reaching a desired temperature, pump apparatus for continuously pumping the thermal fluid to the radiator, the pump apparatus having an inlet for receiving the thermal fluid and an outlet in fluid communication with the inlet of the radiator, and a power supply for selectively providing power to run the fan and/or the pump; such a system wherein the power supply is a battery, and switch apparatus for turning power from the battery on and off; such a system with the battery removably mounted on the support frame within the container; such a system wherein the battery is positioned adjacent to and exteriorly of the container; such a system with the pump apparatus positioned within the container; such a system wherein the thermal fluid is water and the portable air conditioning system also has an amount of ice within the container and some or all of the water removable after the ice melts and the container having sufficient volume to add additional ice; such a system with the fan/radiator assembly hingedly connected to the support frame so that the fan/radiator assembly is positionable at a desired angle with respect to the support frame and so that the fan/radiator assembly is selectively positionable above a top of the container; such a system with positioning apparatus for selectively and releasably holding the fan/radiator assembly in position with respect to the support frame; such a system with a plurality of height-adjustable legs supporting the support frame within the container; such a system with lid apparatus hingedly connected to the container for selectively closing off the container; such a system wherein the thermal fluid is water; such a system wherein the water as pumped from the container to the fan/radiator assembly is in the temperature range of about 35° F. to about 70° F. for cooling or is at least 70° F. and in the range of about 65° F. to about 100° F. for heating; such a system with switch apparatus interconnected with the power supply for turning power on and off; such a system wherein the power supply supplies power to run the pump apparatus; such a system wherein the thermal fluid occupies at least one fourth or at least one half of a total volume of the container.

It is, therefore, an object of at least certain preferred embodiments of the present invention to provide:

New, useful, unique, efficient, nonobvious devices and methods for portable air conditioning systems;

Such a system suitable for use in a room or vehicle without an integral air conditioning system, particularly relatively small rooms, boats, cars, and planes;

Such a system with its own power supply (e.g. but not limited to for supplying power to a fan and/or to a pump) or with a power supply useful as a back-up for an available power supply;

Such a system which can use water as a heat transfer medium;

Such a system with a height-adjustable support;

Such a system with a selective positioning apparatus for directing air flow;

Such a system which can be completely enclosed in a thermal container; and

Such a system to which an initial amount and subsequent additional amounts of ice or hot water or other heat transfer fluid are placed in the container.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 5 is a perspective view of a system according to the present invention.

FIG. 6 is a perspective view of a connection on the support frame of FIG. 5.

DESCRIPTION OF EMBODIMENTS PREFERRED AT THE TIME OF FILING FOR THIS PATENT

Figure 1:
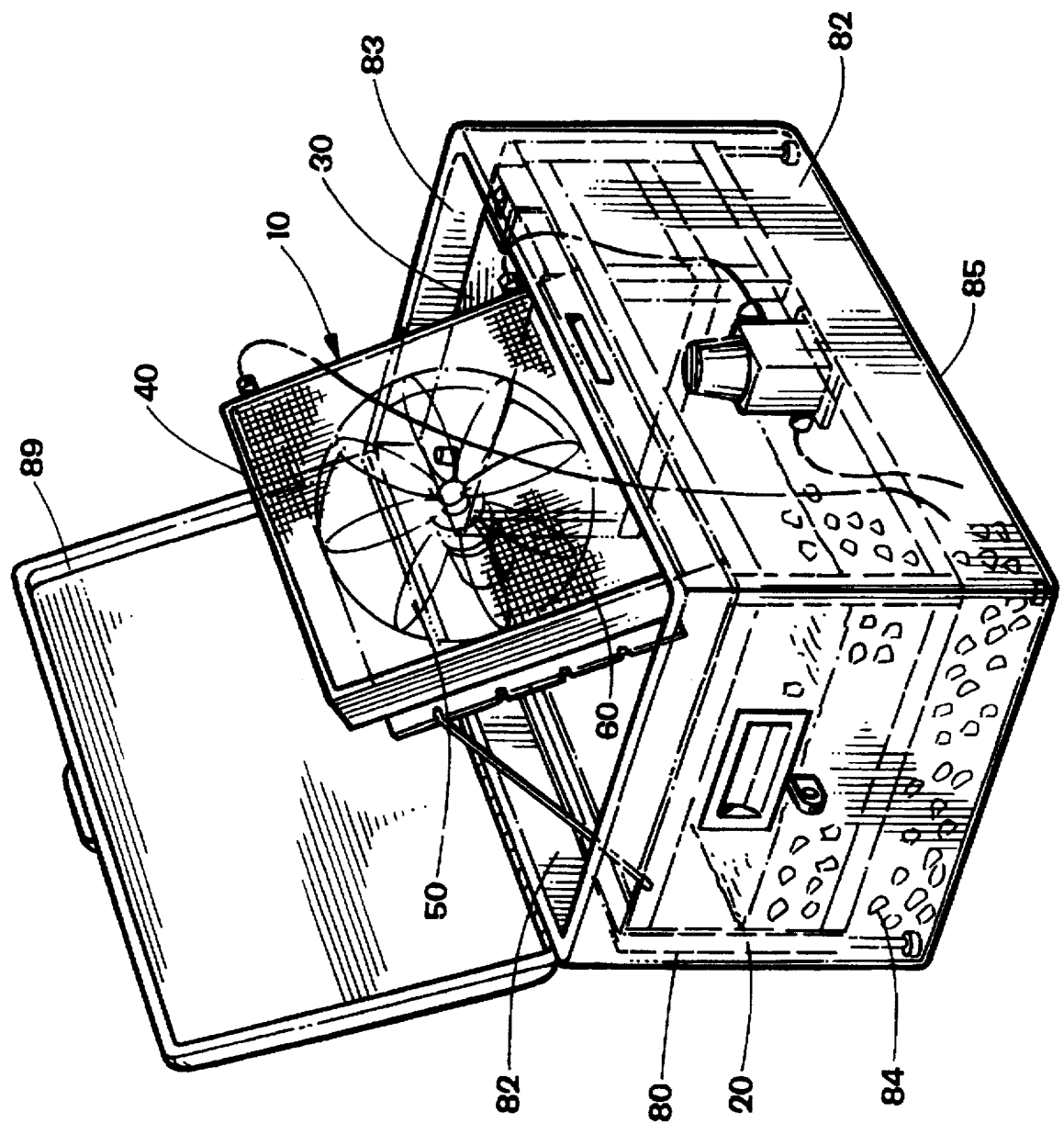
FIG. 1 is a perspective view of a system according to the present invention within a thermal container.
Figure 2:
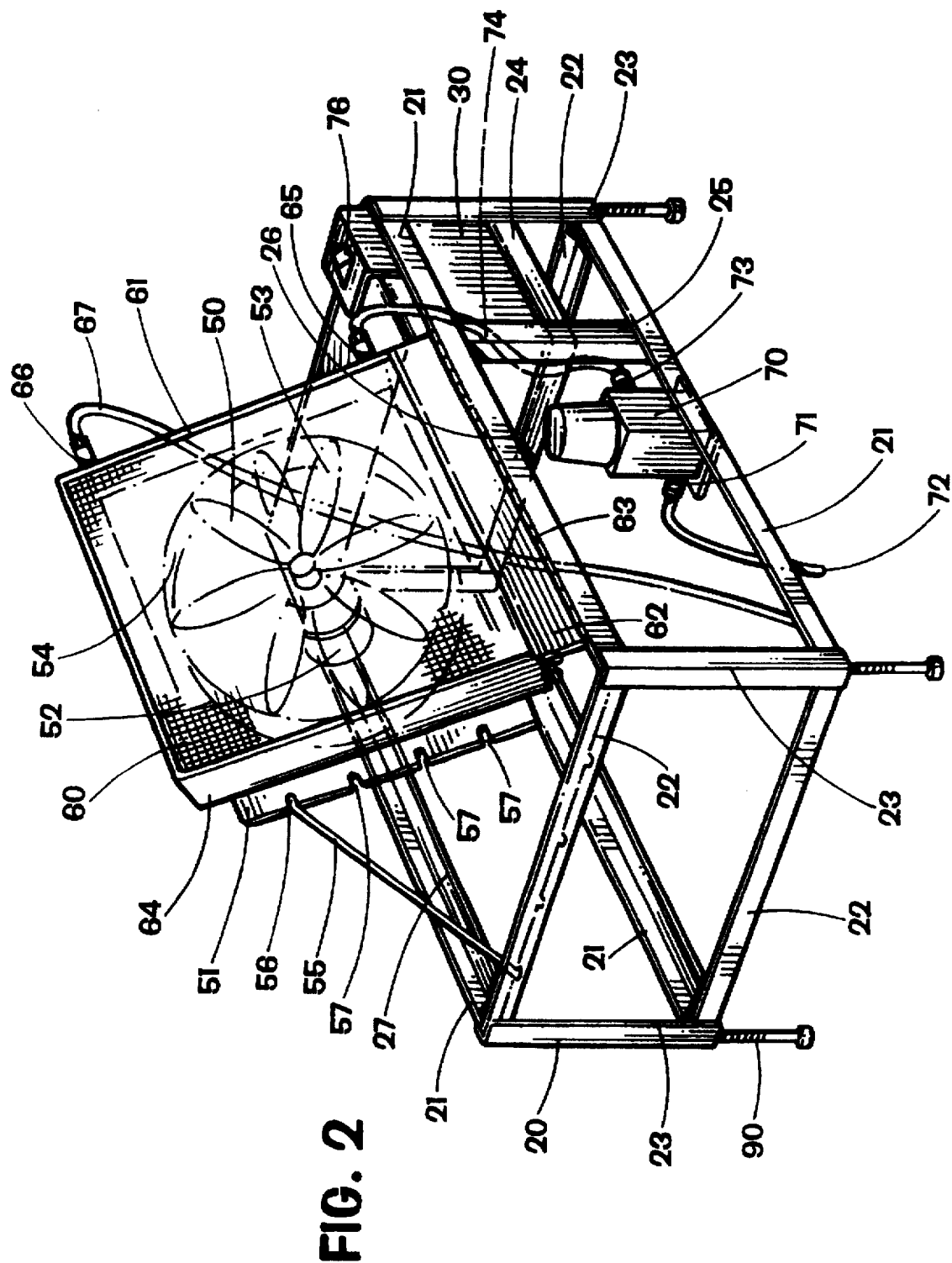
FIG. 2 is a perspective view of the system of FIG. 1.

FIG. 1 shows a system 10 according to the present invention in a thermal container 80. The container 80 has a movable lid 89 hingedly connected to a side wall 82. Side walls 81, 82 space apart ends 83, 84 of the container. A bottom 85 is disposed at the lower portion of the container 80.

The system 10 has a support frame 20 with side braces 21, end braces 22, and vertical members 23. Braces 24, 25 and 26 support a battery 30.

A fan/radiator assembly 40 has a fan 50 and a radiator 60. The radiator 60 has a frame 61 with a lower side 62 that is hingedly connected with a hinge 63 to one of the side braces 21. An edge 64 of the frame 61 rests on a lip 27 of a side brace 21 when the fan/radiator assembly is moved to a horizontal position on the support frame 20.

The fan 50 has a frame 51, a motor 52, and a fan blade 53 mounted in a circular opening 54. A movable arm 55 is movably secured to an end brace 22 and has a top end 56 which is releasably emplaceable in one of a series of notches 57 on the frame 51 to permit selection of a variety of orientations of the fan/radiator assembly 40 with respect to the support frame. In one aspect this makes it possible to close the lid 89 with the system 10 inside the container 80.

A pump 70 powered, e.g. by the battery 30, has a suction inlet 71 with a hose 72 in fluid communication therewith and an outlet 73 with a hose 74 in fluid communication therewith. The pump pumps heat transfer fluid, e.g. water, in through the hose 72 from the container 80 and out through the hose 74 to an inlet 65 of the radiator 60. Fluid is pumped through the radiator 60 and flows out from an outlet 66. It then returns down into the container 80 through a hose 67. A switch 76 controls power to the fan 50 and to the pump 70.

Figure 3:
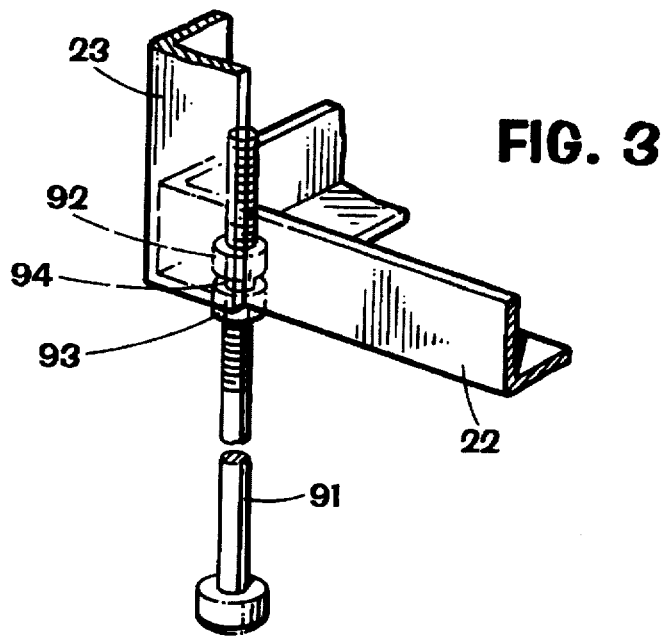
FIG. 3 is a perspective view of a height adjustable leg of the system of FIG. 2.

A plurality of legs 90 support the support frame 20. As shown in FIG. 3, each leg 90 has a threaded bolt 91 and two threaded nuts 92 and 93. Each bolt 91 extends through a hole 94 in its respective brace. The nut 93 is on the support frame's exterior and the nut 92 is in the support frame's interior. Loosening of the nuts permits adjustability of the length of the legs 90 beneath the support frame 20 and, thus, adjustability of the height of the system 10. In another embodiment, a single nut is secured to the support frame, e.g. by welding or soldering, and the leg is threadedly movable in, and therefore selectively adjustable with respect to, the nut.

Figure 4:
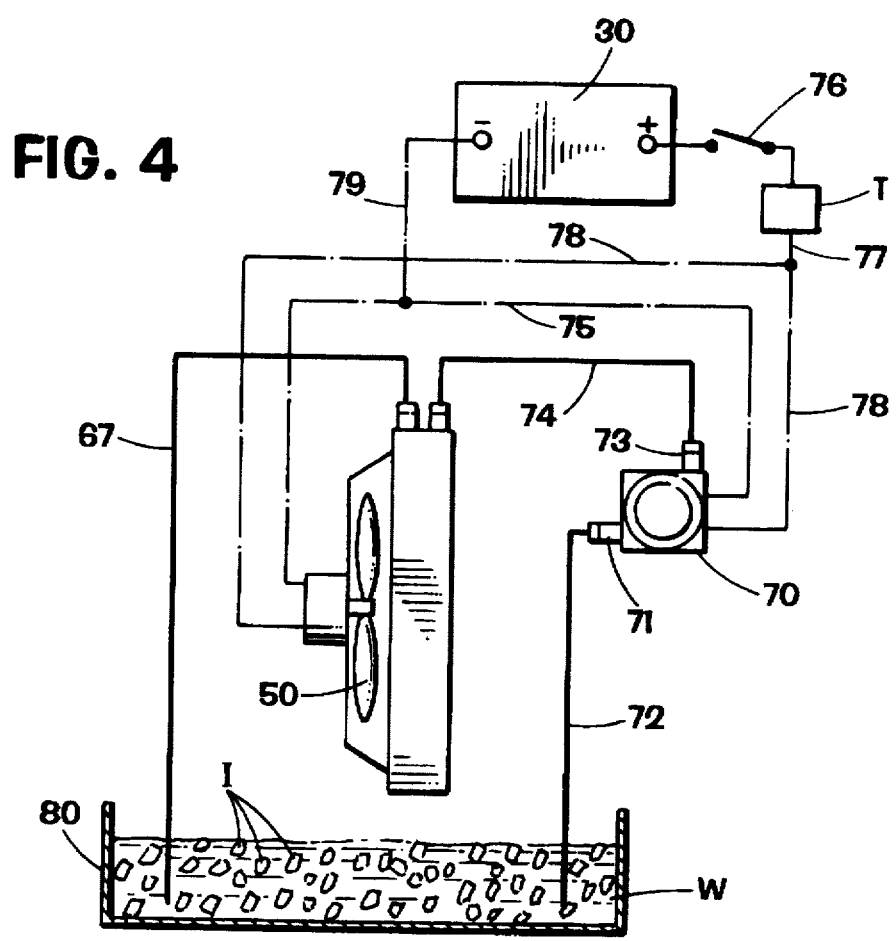
FIG. 4 is a schematic view of a power circuit for the system of FIG. 2.

FIG. 4 shows a typical power circuit for the fan 50 and the pump 70. The switch 76 controls the flow of electricity in lines 77, 78, 79, and 80 which provide electrical power to the fan 50 and the pump 70 from the battery 30. A thermostat T senses temperature in a space to be cooled or heated and, once the switch 76 is closed, turns the system on and off in response to a certain preset threshold temperature. In another embodiment electrical interconnection apparatus is provided to connect the system to an available power supply of a vehicle or room, and the battery is not needed or is used as a back-up power supply. In another embodiment electrical interconnection apparatus is provided to connect the system to an available power supply of a vehicle or room, and the battery is not needed or is used as a back-up power supply.

As shown in FIG. 4, in one embodiment, a mixture of water, W, and ice, I, is used in the container 80. The ice may be replenished.

FIG. 5 shows a system 100 according to the present invention which has an insulated ice chest 110, a pump 120, a support frame 130, and a fan/radiator assembly 140.

The support frame 130 has a base frame 131, intermediate frames 132 and 133, and a cabinet 134. The base frame 131 has two opposed bars 135 and 136 which are spaced apart by tubes 137 and 138. A threaded rod 139 extends through each tube 137, 138 and a washer 139 and wing nut 151 provide for tightening of the frame pieces together.

The intermediate frame 132 has two opposed bars 155 and 156 which are spaced apart by a tube 157 and by the tube 138. The bars 155 and 156 are interconnected with the bars 135, 136 of the base frame 131 as shown in FIGS. 5 and 6. The intermediate frame 133 has bars 165, 166 spaced apart by the tube 157 of the frame 132 and by the cabinet 134. Each bar 165, 166 is releasably held to the cabinet 134 by a bolt (not shown) and wing nut 151, the bolt extending through one of a plurality of holes 161 in the sides of the cabinet 134. One or more lock washers or lock fitting may be used at each connection point in the support frame with the bolts and nuts. Alternatively, each such point may be welded or secured with epoxy.

The cabinet 134 has a front opening 162 over which is mounted a radiator 141. A fan 142 is mounted in the cabinet 134 behind the radiator 141. Cold water flows to the radiator 141 through an inlet 143 and out through an outlet 144. Sides and the rear of the cabinet 134 may be open to facilitate air flow or they may be partially closed off.

The ice chest 110 has a removable lid 111 and an interior space 112 containing water 113, crushed ice 114, a block of ice 115, and a pump 116 on a support frame 117. The pump may be placed on the bottom interior of the ice chest 110 if desired without the support frame 117. A hose 118 extends from a pump outlet 119, through a hole 191 in the lid 111, to the inlet 143 of the radiator 141. A hose 121 extends from a pump inlet 122 into the water in the ice chest. A hose 183 extends from the radiator outlet 144 through a hole 184 in the lid 111 into the ice chest 110. Some or a large part of the hoses 118, 121,183 may be submerged in the ice chest 110.

An electrical power line 170 has an adapter 171 which is suitable for inserting into a cigarette lighter receptacle to provide electrical power via a line 172 to the pump 120 and via a line 173 to the fan 142.

The support frame 130 may be adjusted so that the fan/radiator assembly is at any desired height and so that it directs cooled air therefrom at any desired angle. These features are particularly useful in a vehicle with two or more rows of high-backed seats whose top portions could block air flow.

Figure 7:
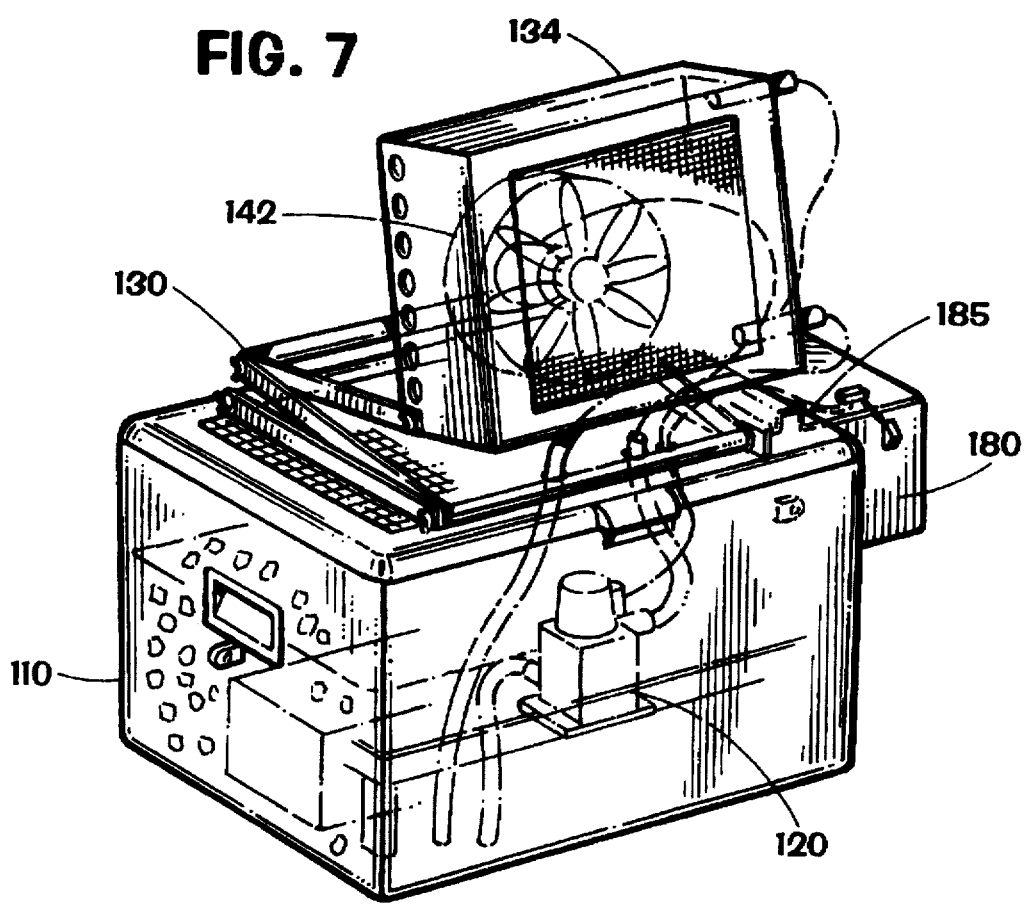
FIG. 7 is a perspective view of a system according to the present invention.

FIG. 7 shows the support frame 130 in a nearly-collapsed state resting on top of the ice chest 110. Also, as shown in FIG. 7, a battery (not shown) in a battery container 180 provides power to the pump 120 and the fan 142.

Figure 8:
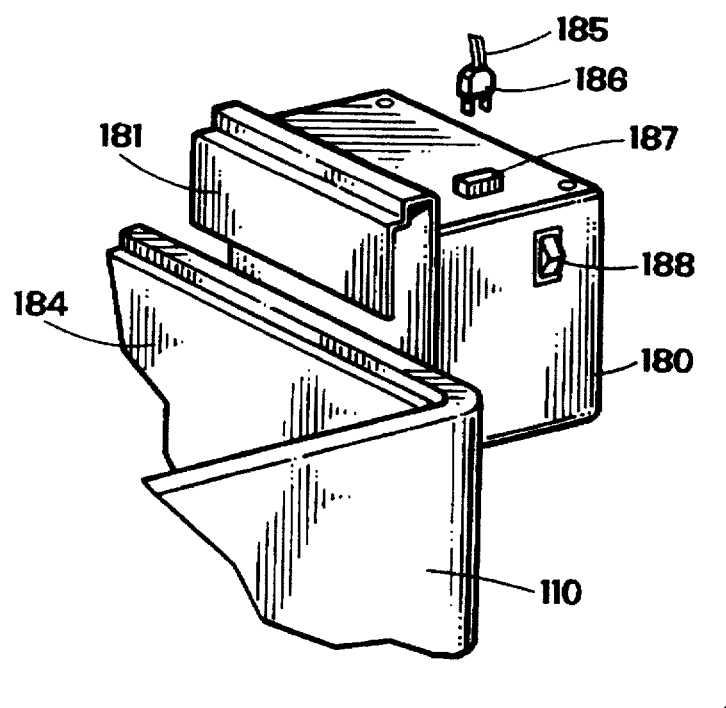
FIG. 8 is a perspective view of a battery container for a system as described herein.

As shown in FIG. 8, the battery container 180 has a lip 181 which is insertable over a side 184 of the ice chest 110 to support the container 180 on the ice chest 110. Appropriate electrical connections and fixtures are provided so a power line 185 has a plug 186 which is plugged into a female power outlet 187 on the battery container 180. The female power outlet 187 is interconnected with the battery in the battery container 180. An OFF/ON switch 188 is interconnected with the battery. It is within the scope of this invention to provide separate power lines and switches for the pump and the fan so that the fan may be operated independently of the pump; or to use a selector switch which allows pump/fan operation, pump alone operation, or fan alone operation.

In any system described or claimed herein a commercially available thermostat apparatus may be used positioned anywhere in the system at a point at which it can sense the temperature of thermal fluid flowing to or from the radiator. The thermostat may be interconnected with the pump and/or with the fan to turn power off when a particular temperature is sensed or to turn power on when a particular temperature is sensed.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

What is claimed is:

1. A portable air conditioning system comprising a support frame, a fan/radiator assembly on the support frame, the fan/radiator assembly comprising a fan and a radiator, the fan mounted adjacent the radiator for propelling air through the radiator, the radiator having an inlet for receiving thermal fluid and an outlet from which the thermal fluid flows out from the radiator, a container for containing the thermal fluid, a removable supply of thermal fluid in the container for flowing through the radiator, the removable supply of thermal fluid removable from the container upon reaching a desired temperature, pump apparatus for continuously pumping the thermal fluid to the radiator, the pump apparatus having an inlet for receiving the thermal fluid and an outlet in fluid communication with the inlet of the radiator, and wherein the thermal fluid occupies at least one fourth of a total volume of the container.

2. The portable air conditioning system of claim 1 further comprising positioning apparatus for selectively and releasably holding the fan/radiator assembly in position with respect to the support frame.

3. The portable air conditioning system of claim 1 further comprising a power supply for selectively providing power to run the fan.

4. The portable air conditioning system of claim 2 further comprising the power supply comprising a battery, and switch apparatus for turning power from the battery on and off.

5. The portable air conditioning system of claim 4 further comprising the battery removably mounted on the support frame within the container.

6. The portable air conditioning system of claim 4 further comprising the battery positioned adjacent to and exteriorly of the container.

7. The portable air conditioning system of claim 1 further comprising the pump apparatus positioned within the container.

8. The portable air conditioning system of claim 1 wherein the thermal fluid is water and the portable air conditioning system further comprising the container for containing the support frame, the fan, and the radiator, and an amount of ice within the container.

9. The portable air conditioning system of claim 1 further comprising lid apparatus hingedly connected to the container for selectively closing off the container.

10. The portable air conditioning system of claim 1 wherein the thermal fluid is water.

11. The portable air conditioning system of claim 1 wherein the water as pumped is at a temperature of at least 70° F.

12. The portable air conditioning of system of claim 1 wherein the water is at a temperature of at least ninety degrees.

13. The portable air conditioning system of claim 1 further comprising the support frame comprising a plurality of frame parts, the frame parts releasably interconnected so that height of the support frame is adjustable, a cabinet releasably secured to one of the frame parts, the cabinet for holding the fan/radiator assembly, and the cabinet adjustable with respect to a frame part to which it is secured so that cooled air may be directed therefrom at a desired angle.

14. The portable air conditioning system of claim 1 further comprising a power supply for selectively providing power to run the pump apparatus.

15. A portable air conditioning system comprising a support frame, a fan/radiator assembly on the support frame, the fan/radiator assembly comprising a fan and a radiator, the fan mounted adjacent the radiator for propelling air through the radiator, the radiator having an inlet for receiving thermal fluid and an outlet from which the thermal fluid flows out from the radiator, a container for containing the thermal fluid, a removable supply of thermal fluid in the container for flowing through the radiator, the removable supply of thermal fluid removable from the container upon reaching a desired temperature, pump apparatus for continuously pumping the thermal fluid to the radiator, the pump apparatus having an inlet for receiving the thermal fluid and an outlet in fluid communication with the inlet of the radiator, and a plurality of height-adjustable legs supporting the support frame within the container.

16. A portable air conditioning system comprising a support frame, a fan/radiator assembly on the support frame, the fan/radiator assembly comprising a fan and a radiator, the fan mounted adjacent the radiator for propelling air through the radiator, the radiator having an inlet for receiving thermal fluid and an outlet from which the thermal fluid flows out from the radiator, a container for containing the thermal fluid, a removable supply of thermal fluid in the container for flowing through the radiator, the removable supply of thermal fluid removable from the container upon reaching a desired temperature, pump apparatus for continuously pumping the thermal fluid to the radiator, the pump apparatus having an inlet for receiving the thermal fluid and an outlet in fluid communication with the inlet of the radiator, and the fan/radiator assembly hingedly connected to the support frame so that the fan radiator assembly is positionable at a desired angle with respect to the support frame and so that the fan/radiator assembly is selectively positionable above a top of the container.

* * * * *